(12) United States Patent
D'Arbonneau

(10) Patent No.: US 11,661,210 B2
(45) Date of Patent: May 30, 2023

(54) METHOD FOR DETECTING A BLOCKAGE OF AT LEAST ONE WIND VANE OF AN AIRCRAFT AND ASSOCIATED SYSTEM

(71) Applicant: DASSAULT AVIATION, Paris (FR)

(72) Inventor: François-Xavier D'Arbonneau, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 582 days.

(21) Appl. No.: 16/583,445

(22) Filed: Sep. 26, 2019

(65) Prior Publication Data

US 2020/0102096 A1    Apr. 2, 2020

(30) Foreign Application Priority Data

Sep. 27, 2018    (FR) ..................................... 18 01005

(51) Int. Cl.
*B64F 5/60*    (2017.01)
*B64C 19/00*    (2006.01)
*G01C 9/00*    (2006.01)

(52) U.S. Cl.
CPC ................ *B64F 5/60* (2017.01); *B64C 19/00* (2013.01); *G01C 9/005* (2013.01)

(58) Field of Classification Search
None
See application file for complete search history.

(56) References Cited

U.S. PATENT DOCUMENTS

| 4,672,846 A | 6/1987 | Leblond et al. |
| 5,257,536 A | 11/1993 | Beigbeder et al. |
| 6,561,006 B1 * | 5/2003 | Roberge ................ G01P 21/025 73/1.75 |
| 9,944,404 B1 * | 4/2018 | Gentry ................. G07C 5/0816 |
| 2008/0128556 A1 * | 6/2008 | Platt ....................... B64D 15/20 244/134 F |
| 2013/0317691 A1 | 11/2013 | Schott et al. |
| 2015/0006019 A1 | 1/2015 | D'Arbonneau |
| 2015/0006020 A1 | 1/2015 | D'Arbonneau |
| 2015/0006021 A1 | 1/2015 | D'Arbonneau et al. |

(Continued)

FOREIGN PATENT DOCUMENTS

| EP | 2642302 A1 | 9/2013 |
| EP | 3190420 A1 | 7/2017 |
| FR | 2847673 A1 | 5/2004 |

OTHER PUBLICATIONS

Search Report for priority application FR 1801005.

*Primary Examiner* — Shon G Foley
(74) *Attorney, Agent, or Firm* — Davidson, Davidson & Kappel, LLC

(57) ABSTRACT

A method is for detecting a blockage of a wind vane (12) of an aircraft, with the wind vane (12) including a support (20), a paddle (22) mounted rotating relative to the support (20) along an axis (A), a motor (28) able to exert a rotational torque on the paddle (22) along the axis (A), the motor (28) being connected to a processing unit (18). The method includes applying a predetermined blockage detection torque on the paddle (22) by the motor (28); measuring at least one piece of information representative of a resistance of the paddle (22) to the predetermined detection torque; and generating, via the processing unit (18), a blocking information signal, if a predetermined condition based on the representative information is verified.

19 Claims, 3 Drawing Sheets

(56) References Cited

U.S. PATENT DOCUMENTS

| | | | |
|---|---|---|---|
| 2015/0052994 A1* | 2/2015 | Dupont De Dinechin | G01P 21/025 73/180 |
| 2017/0158336 A1* | 6/2017 | Meis | B64D 15/22 |
| 2020/0074827 A1* | 3/2020 | Scattolin | B64D 15/20 |

* cited by examiner

METHOD FOR DETECTING A BLOCKAGE OF AT LEAST ONE WIND VANE OF AN AIRCRAFT AND ASSOCIATED SYSTEM

The present disclosure relates to a method for detecting a blockage of at least one wind vane of an aircraft.

BACKGROUND

In an aircraft, wind vanes are typically used to measure the angle of attack of the aircraft. However, given that they are in contact with the mass of air outside the aircraft, they are sensitive to ice or elements that may disrupt their operation (such as volcanic ash). In particular, they may become blocked in position due to ice and therefore provide an incorrect angle of attack.

Causes other than ice exist that may cause the wind vane to become blocked in position. For example, a foreign body may jam the wind vane in position.

"Blockage" refers to a strong limitation of the mobility of the wind vane, this strong limitation being able to be a complete immobilization in position of the wind vane or a very strong slowdown of the mobility of the wind vane.

It is currently known to detect the blockage of a wind vane, in particular due to ice, by comparing the angle of attack measured by this wind vane to the angles of attack measured by the other wind vanes of the aircraft, typically by means of an average out of these measured angles of attack.

However, this method is not fully satisfactory.

Indeed, this method can be misled in that it is based on the comparison of the measurements from the wind vanes to each other. In the event that several wind vanes are blocked, this method does not allow a precise identification of the blocked wind vanes.

Furthermore, the detection by this method can be late. During a long stable flight phase, a wind vane can in fact be blocked, in particular by ice, in a position that is consistent with respect to the expected measured angle of attack and with respect to the other wind vanes. This blocking may then not be detected as quickly by the known method.

Methods are also currently known for overcoming the blockage by ice of wind vanes, such as electric heating of the wind vanes, or the change of angle of attack or flight level in progress to seek a higher temperature or different conditions.

However, these methods are also not satisfactory, since they are complicated and/or energy-consuming.

SUMMARY

One aim of the present disclosure is therefore to provide a method making it possible to ensure the detection of the blockage in position of a wind vane of an aircraft precisely and simply.

Another aim of the present disclosure is to provide a method making it possible to ensure the unblocking of a wind vane blocked in position of an aircraft, simply and in a manner consuming little energy.

A method is provided for detecting a blockage of at least one wind vane of an aircraft, characterized in that the wind vane comprises a support, a paddle mounted rotating relative to the support along a rotation axis, a motor able to exert a rotational torque on the paddle along the rotation axis, the motor being connected to a processing unit; the method comprising at least the following steps;

applying a predetermined blockage detection torque on the paddle by the motor;

measuring at least one piece of information representative of a resistance of the paddle to the predetermined detection torque;

generating, via the processing unit, a blocking information signal of the wind vane, if a predetermined condition based on the representative information is verified.

The method may comprise one or more of the following optional features, considered alone or according to any technically possible combination(s):

the wind vane comprises an angular sensor capable of measuring an angular position of the paddle around the axis of rotation; the method comprising, before the step for application of the predetermined blockage detection torque, a step for measurement by the angular sensor of an initial angular equilibrium position of the paddle; the step for verification of the predetermined condition comprising the following sub-steps:

measurement by the angular sensor of an imposed actual angular equilibrium position of the paddle subjected to the predetermined torque, the representative information being the imposed actual angular equilibrium position;

calculating the actual angular misalignment between the imposed actual angular equilibrium position and the initial angular equilibrium position; and comparing the actual angular misalignment to an angular threshold, the predetermined condition being verified if the calculated actual angular misalignment is below the angular threshold;

the angular threshold is an angular threshold predetermined as a function of a maximum speed achievable by the aircraft during a stabilized flight phase, the applied torque advantageously being a predetermined torque so that the theoretical angular misalignment is detectable by the angular sensor;

the verification step comprises, before the comparison sub-step, a sub-step for determining the angular threshold comprising measuring a speed of the air flow circulating around the paddle, the angular threshold being determined as a function of said measured speed of the air flow circulating around the paddle, and/or wherein the method comprises, before applying the predetermined detection torque, determining the predetermined blockage detection torque to be applied as a function of said measured speed of the air flow;

the verification step comprises, before the comparison sub-step, a sub-step for determining an angular threshold, comprising:

measuring the evolution over time of the angular position of the paddle, from the beginning of the step for application of the predetermined detection torque; and determining the natural frequency to the oscillations around the imposed actual angular equilibrium position of said evolution over time, the angular threshold being determined as a function of said natural frequency;

the wind vane further comprises a sensor of the motor capable of measuring an electromagnetic parameter within the motor, the step for verification of the predetermined condition being implemented from the beginning of the step for application of the predetermined blockage detection torque, the verification step comprising the following sub-steps:

measuring said electromagnetic parameter via the sensor of the motor at a plurality of measuring moments during a determined time interval, the representative information being the electromagnetic parameter; and comparing the electromagnetic parameter, measured at each measurement moment, to a predetermined electromagnetic parameter threshold, the predetermined condition being verified if the electromagnetic parameter is above the predetermined electromagnetic parameter threshold;

the method is implemented during a flight phase of the aircraft, preferably a stabilized flight phase of the aircraft, for example a cruising flight phase of the aircraft;

the method comprises, after the verification step, if the predetermined blockage detection condition is verified, unblocking the wind vane by applying a predetermined unblocking torque on the paddle by the motor;

the method comprises, after the application of the predetermined unblocking torque, reiterating the steps for applying a predetermined detection torque at least once, verifying a predetermined condition representative of a resistance of the paddle to the predetermined detection torque, and generating an information signal via the processing unit;

the value of the predetermined unblocking torque is developed as a function of the calculated actual angular misalignment;

the predetermined unblocking torque is a torque of variable value and/or direction;

a system for piloting the aircraft is configured to acquire a signal representative of an angle of attack of the aircraft measured by said wind vane, the method comprising, if the predetermined condition is verified, a step for deactivating the acquisition of the signal representative of an angle of attack measured by the blocked wind vane;

the aircraft comprises at least one other wind vane, the method comprising, successively for each wind vane, the application of a predetermined blockage detection torque on the paddle of the wind vane by the motor of said wind vane; the verification of a predetermined condition representative of a resistance of said paddle of the wind vane to the predetermined detection torque; and the generation, by the processing unit, of a blockage information signal of said wind vane, if the predetermined condition is verified; and the method comprises, before the implementation of the step for applying the predetermined detection torque, an implementation authorization verification step, the step for applying the predetermined detection torque only being implemented if it is authorized, the implementation being authorized if the aircraft comprises a number of wind vanes capable of operating greater than the maximum number of wind vanes required in order for a piloting system of the aircraft to be able to operate, and/or if the flight phase of the aircraft is a stabilized flight phase.

A system is also provided for detecting a blockage of at least one wind vane of an aircraft, the system comprising:

the wind vane, the wind vane comprising a support, a paddle rotating relative to the support along a rotation axis, a motor able to exert a rotational torque on the paddle along the rotation axis; and a processing unit configured to command the motor so that it applies a predetermined blockage detection torque on the paddle, the system comprising a sensor for measuring information representative of a resistance of the paddle to the predetermined detection torque, the processing unit being configured to generate a blockage information signal of the wind vane, if a predetermined condition based on information representative of a paddle resistance to the predetermined detection torque is verified.

An aircraft comprising the blockage detection system described above is also provided.

A method is also provided for unblocking a wind vane of an aircraft, the wind vane comprising a support, a paddle mounted rotating relative to the support along a rotation axis, and a motor able to exert a rotational torque on the paddle along the rotation axis; the method comprising the application of a predetermined unblocking torque on the paddle by the motor.

BRIEF SUMMARY OF THE DRAWINGS

The invention will be better understood upon reading the following description, provided solely as an example and done in reference to the appended drawings, in which.

DETAILED DESCRIPTION

Figure 1:
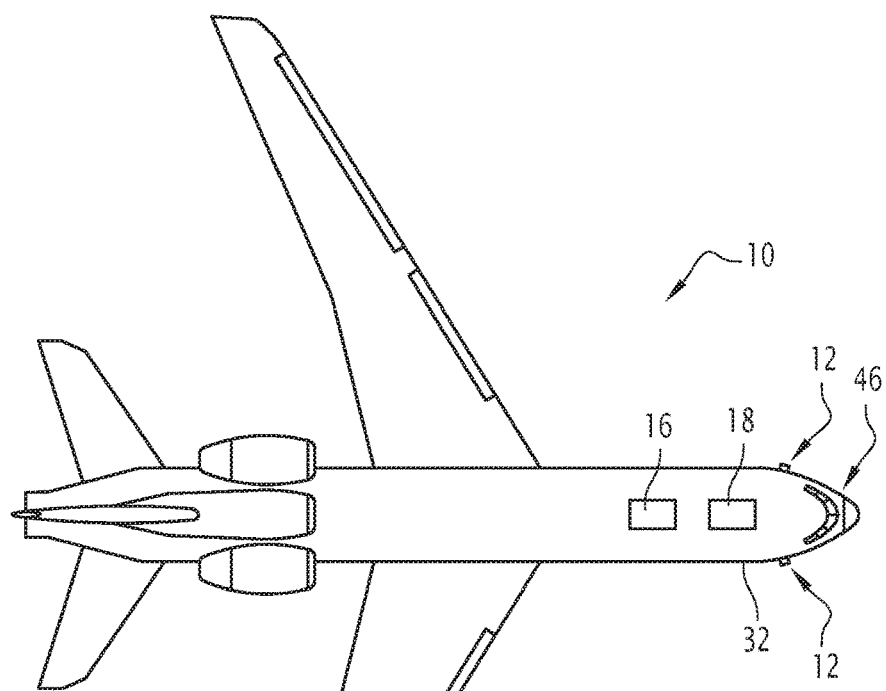
FIG. 1 is a schematic top view of an aircraft comprising a first system for detecting the blockage of at least one wind vane of the aircraft according to an embodiment of the invention.

An aircraft 10 according to an embodiment of the invention is illustrated in FIG. 1.

The aircraft 10 comprises at least one wind vane 12 and a first system 14 for detecting the blockage of said wind vane 12.

The aircraft 10 also comprises a piloting system 16 of the aircraft 10.

The first detection system 14 comprises a processing unit 18.

Figure 2:
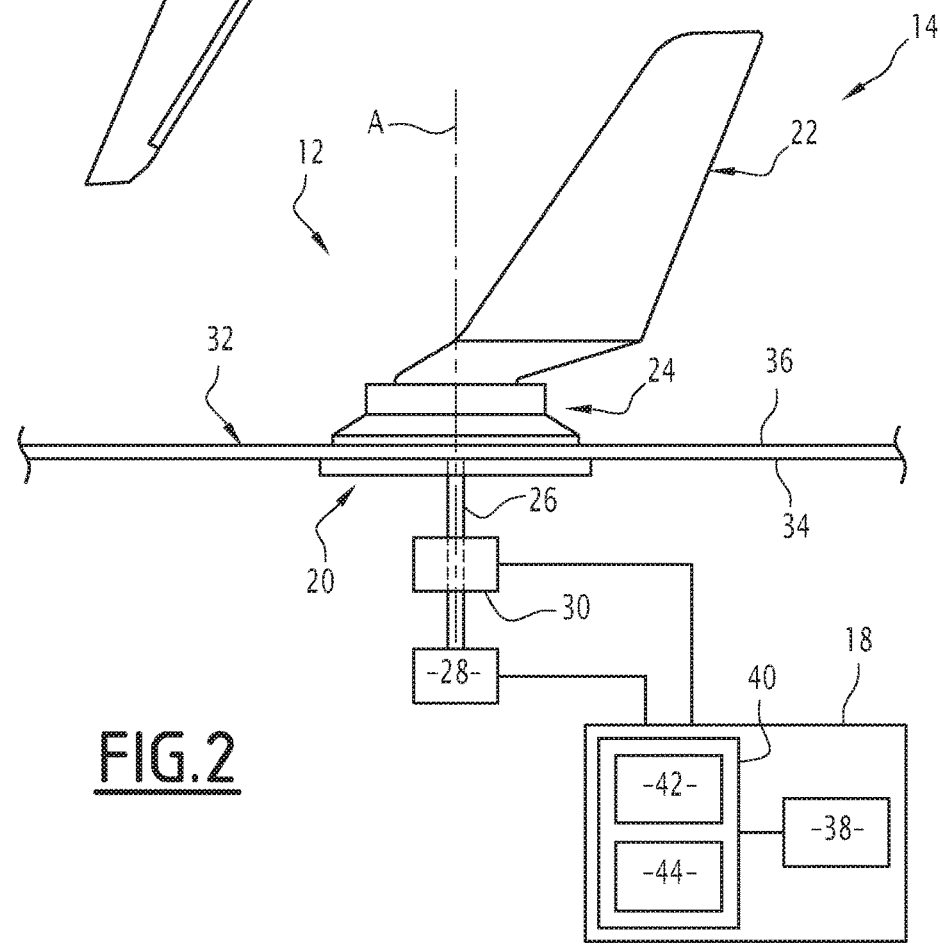
FIG. 2 is a schematic profile view of the first detection system of FIG. 1.
Figure 3:
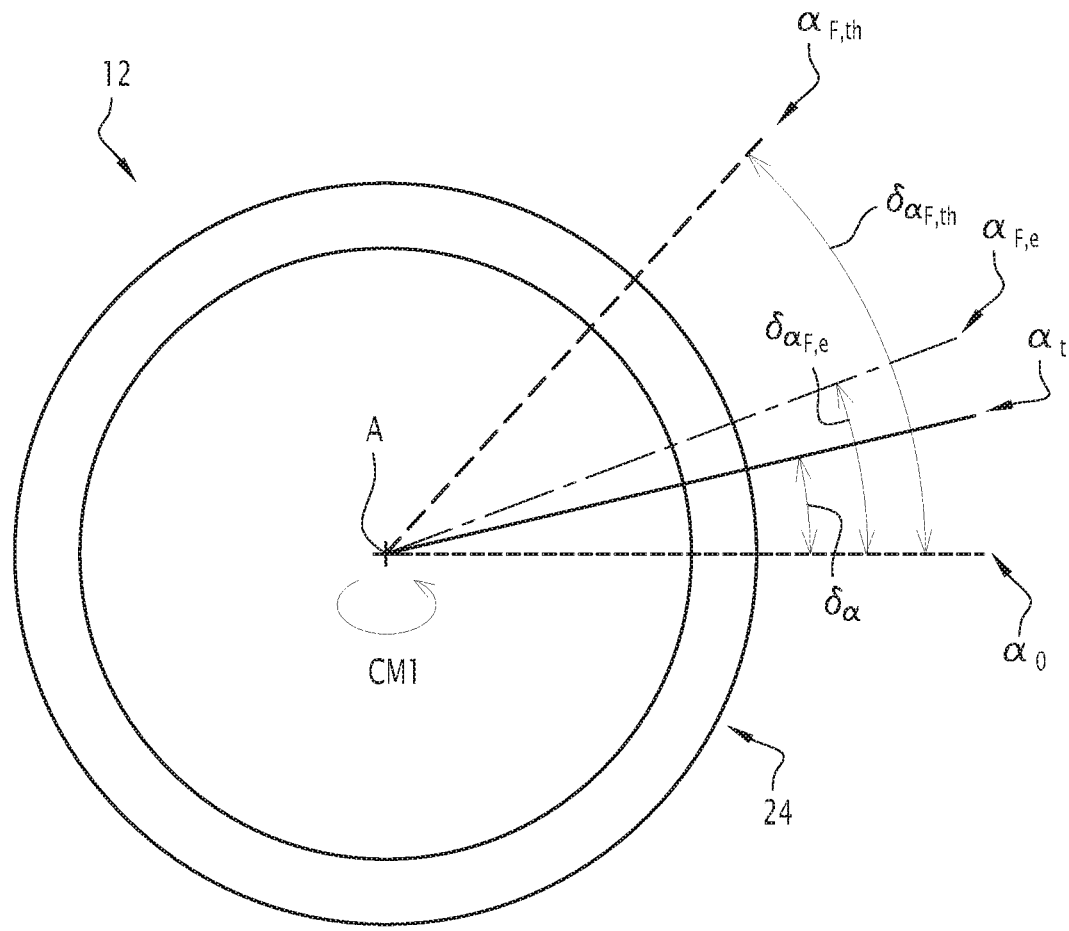
FIG. 3 is a schematic view along the rotation axis of FIG. 2, of different positions of the wind vane.

The wind vane 12 is illustrated in more detail in FIG. 2.

It is carried by the aircraft 10 outside the fuselage of the aircraft 10 and is capable of measuring an angle of attack of the aircraft 10. The piloting system 16 of the aircraft 10 is configured to acquire, for example continuously, a signal representative of the angle of attack of the aircraft 10 measured by said wind vane 12.

The wind vane 12 comprises a support 20 and a paddle 22 mounted rotating relative to the support 20 along a rotation axis A.

The example of FIG. 2, the wind vane 12 comprises a base 24 and a shaft 26 that are movable jointly with the paddle 22.

The wind vane 12 also comprises a motor 28 capable of exerting a rotational torque on the paddle 22 along the rotation axis A.

In the first detection system 14, illustrated in FIG. 2, the wind vane 12 further comprises an angular sensor 30 capable of measuring an angular position of the paddle 22 around the rotation axis A.

The support 20 here is secured to an outer wall 32 of the aircraft 10.

The support 20 is for example attached against a surface of the outer wall 32.

The paddle 22 protrudes relative to an outer surface 36 of the outer wall 32.

It is in contact with an outer mass of air surrounding the aircraft 10.

The paddle 22 is rotatable around the rotation axis A, relative to the support 20, to align itself with the speed of the air flow applied on the paddle 22.

The base 24 is movable jointly with the paddle 22 and is therefore capable of rotating around the rotation axis A, relative to the support 20.

The base 24 is inserted between the paddle and the outer wall 32.

The base 24 here is attached against the outer surface 36 of the outer wall 32.

Ball bearings are for example inserted between the shaft 26 and the support 20 and between the base 24 and the outer surface 36.

The angular sensor 30 is advantageously a potentiometer. In a variant, the angular sensor 30 is of the RVDT (Rotary Variable Differential Transformer) type.

During its use, the wind vane 12 has a blocked state or a non-blocked state.

In the blocked state of the wind vane 12, a force other than the wind opposes a rotation of the paddle 22 around its rotation axis A relative to the support 20. Thus the blocked state corresponds either to a blocking in position of the paddle, that is to say that said force is sufficient to prevent any rotation of the paddle, or a great slowing of the rotation of the paddle.

Thus, "detection of the blockage of the wind vane 12" refers to the detection of whether the wind vane is in the blocked or unblocked state defined above.

The blocked state for example corresponds to icing of the wind vane, where ice is present on the paddle 22, typically on the base 24, and opposes a rotation of the paddle 22 around its rotation axis A relative to the support 20. For example, this ice blocks or greatly slows this rotation.

The blocked state for example also corresponds to a foreign body jamming the wind vane in position.

As opposed to the blocked state, in the unblocked state of the wind vane 12, no force other than the wind substantially opposes a rotation of the paddle 22 around its rotation axis A relative to the support 20.

It should be noted that, even in the unblocked state, ice can be present on the paddle 22, but this ice is then such that it does not oppose a rotation of the paddle 22 around its rotation axis A.

In other words, in the unblocked state, the paddle 22 is able to rotate freely around the rotation axis A and align itself in the direction of the air flow circulating around the paddle 22 based on the speed of the air flow circulating around the paddle 22.

The motor 28 here is an electric motor.

It is capable of exerting a rotational torque on the paddle 22 along the rotation axis A for example greater than 0.05 N·m, preferably greater than 0.1 N·m, in particular greater than 0.2 N·m.

The processing unit 18 is connected to the motor 28 and the angular sensor 30.

The processing unit 18 comprises a processor 38 and at least one memory 40.

The processor 38 is suitable for executing modules contained in the memory 40.

The memory 40 comprises a detection module 42 for blockage of the wind vane 12 and an unblockage module 44 of the wind vane 12.

The detection module 42 is capable of being triggered by a crewmember of the aircraft 10, advantageously from a cockpit 46 of the aircraft 10, or by the piloting system 16 of the aircraft 10. The crewmember is in particular a pilot of the aircraft 10.

The detection module 42 is configured to acquire an initial angular equilibrium position $\alpha_0$ of the paddle 22, measured by the angular sensor 30.

The detection module 42 is configured to command the motor 28 so that it applies a predetermined blockage detection torque CM1 on the paddle 22.

The detection module 42 is configured to acquire information representative of the resistance of the paddle 22 to the predetermined detection torque CM1 and to determine whether a predetermined condition based on the information representative of a resistance of the paddle 22 to the predetermined detection torque CM1 is verified.

This predetermined condition is chosen such that its verification means that the wind vane 12 is in the blocked state.

In the first detection system 14, this predetermined condition relates to the angular position of the paddle 22.

Indeed, in the case where the wind vane 12 is in the non-blocked state, the paddle 22 subject to the predetermined detection torque CM1 rotates around its rotation axis A. The paddle 22 therefore has, at a given moment, an angular misalignment $\delta\alpha$ corresponding to the difference between the angular position $\alpha_t$ at the given moment of the paddle 22, and the initial angular equilibrium position $\alpha_0$.

The angular misalignment $\delta\alpha$ at a given moment verifies:

$$\delta\alpha = \alpha_t - \alpha_0$$

From the application of the predetermined torque CM1, the angular misalignment $\delta\alpha$ verifies the following equation:

$$J\ddot{\delta\alpha} + K2\dot{\delta\alpha} + K1 V^2 \delta\alpha = CM1$$

where J is the moment of inertia of the wind vane;

K2 is the friction coefficient of the wind vane;

K1 is designated hereinafter as the aerodynamic reactive force coefficient of the wind vane; and V is the true airspeed of the air applied on all of the elements of the wind vane that are secured and rotatable.

In particular, "moment of inertia of the wind vane" refers to the moment of inertia of all of the moving elements of the wind vane. Furthermore, "friction coefficient of the wind vane" refers to the friction coefficient between all of the moving elements and the entire surface outside this assembly and in contact therewith, typically in the rolling bearings, the joints and the cursors of the potentiometers.

The coefficients K1 and K2 are typically determined through experimental trials, in particular in wind tunnels, preliminary to the blockage detection method described hereinafter.

In the case where the wind vane 12 is in the non-blocked state, the paddle 22 stabilizes in a theoretical imposed angular equilibrium position $\alpha_{F,th}$.

This position depends on the predetermined detection torque CM1 that is applied.

In particular, the paddle 22 has a theoretical angular misalignment $\delta\alpha_{F,th}$, corresponding to the difference between the imposed theoretical angular equilibrium position $\alpha_{F,th}$ and the initial angular equilibrium position $\alpha_0$.

This theoretical angular misalignment $\delta\alpha_{F,th}$ verifies:

$$\delta\alpha_{F,th} = \frac{CM1}{K1V^2}$$

The predetermined blockage detection torque CM1 is determined so that the theoretical angular misalignment $\delta\alpha_{F,th}$ is detectable by the angular sensor 30. For example, the predetermined blockage detection torque CM1 is determined so that the theoretical angular misalignment $\delta\alpha_{F,th}$ is greater than or equal to 1°.

To that end, the predetermined blockage detection torque CM1 of the motor 28 is for example greater than 0.05 N·m, preferably greater than 0.1 N·m, in particular greater than 0.2 N·m. The motor 28 is thus dimensioned to meet the needs of the blockage detection method.

In the case where the wind vane 12 is in the locked state, the paddle 22 stabilizes in an imposed actual angular equilibrium position $\alpha_{F,e}$ different from the imposed theoretical angular equilibrium position $\alpha_{F,th}$, and closer to the initial angular equilibrium position $\alpha_0$. Indeed, a resistant constraint due to the blockage is exerted on the paddle 22 against its rotation around the rotation axis A.

The imposed actual angular equilibrium position $\alpha_{F,e}$ then constitutes said representative information acquired by the detection module 42.

The detection module 42 is configured to measure, via the angular sensor 30, this imposed actual angular equilibrium position $\alpha_{F,th}$, for example after a predetermined length of time from the beginning of the application of the predetermined torque CM1. This predetermined time is chosen so that the paddle 22 is stabilized in the imposed actual angular equilibrium position $\alpha_{F,th}$.

This time is generally between 0 s and 10 s.

The paddle 22 then has an actual angular misalignment $\delta\alpha_{F,e}$, corresponding to the difference between the imposed actual angular equilibrium position $\alpha_{F,e}$ and the initial angular equilibrium position $\alpha_0$.

The detection module 42 is configured to calculate the actual angular misalignment $\delta\alpha_{F,e}$ and to compare the actual angular misalignment $\delta\alpha_{F,e}$ to an angular threshold.

The angular threshold is for example less than 50% of the theoretical angular misalignment $\delta\alpha_{F,th}$.

Preferably, the angular threshold is an angular threshold predetermined as a function of a maximum speed achievable by the aircraft 10 during a stabilized flight phase.

If the calculated angular misalignment is below the angular threshold, the detection module 42 is configured to determine that the predetermined condition is verified, and therefore that the wind vane 12 is in its blocked state.

Indeed, if the calculated actual angular misalignment $\delta\alpha_{F,e}$ is below the angular threshold, this in fact means that the paddle 22 has not rotated around the rotation axis A enough to reach the position and that it is blocked, for example by an accumulation of ice.

If the calculated angular misalignment is not below the angular threshold, the detection module 42 is configured to determine that the predetermined condition is not verified, and therefore that the wind vane 12 is in its non-blocked state.

The detection module 42 is for example configured to generate a blockage information signal of the wind vane 12, if the predetermined condition is verified, and a non-blockage information signal of the wind vane 12, if the predetermined condition is not verified.

The detection module 42 is configured to send the blockage or non-blockage information signal of the wind vane 12 to the attention of at least one crew member, for example in the form of a light signal or an alert message to be displayed in the cockpit 46 and/or a sound message to be broadcast in the cockpit 46.

Preferably, the detection module 42 is configured to deactivate the acquisition by the piloting system 16 of the signal representative of the angle of attack measured by the wind vane 12, at least from the beginning of the application of the predetermined detection torque CM1 and at least until the generation of the blockage or non-blockage information signal of the wind vane 12.

Furthermore, if the predetermined condition is verified, the detection module 42 is configured to deactivate the acquisition by the piloting system of the signal representative of the angle of attack measured by the wind vane 12 in the blocked state.

If the predetermined condition is not verified, the wind vane is therefore not in a blocked state, and the detection module 42 is configured to reactivate the acquisition of the signal representative of the angle of attack measured by the wind vane 12.

The unblocking module 44 of the wind vane 12 is configured to apply a predetermined unblocking torque on the paddle 22 via the motor 28 when the predetermined blockage detection condition is verified.

The predetermined unblocking torque is intended to take the wind vane 12 from the blocked state to the non-blocked state, and at least to unblock the rotation of the paddle 22 relative to the support 20.

The value of the predetermined unblocking torque is for example greater than 5 times the value of the predetermined blockage detection torque CM1, in particular between 5 and 10 times the value of the predetermined blockage detection torque CM1.

Preferably, the predetermined unblocking torque is a torque of variable value and/or direction. This variation in value or direction makes it possible to improve the unblocking of the paddle 22.

The unblocking module 44 of the wind vane 12 is configured to apply the predetermined unblocking torque during a predetermined time period.

The detection module 42 and the unblocking module 44 are capable of interrupting the detection method at any time under the action of a crewmember or automatically as a function of detected failures of the aircraft 10, or if the length of time taken by the method is too long.

Said "detected failures of the aircraft 10" are for example failures of wind vanes of the aircraft 10, such failures not necessarily being due to the blockage, in particular due to blockage by ice.

Thus, the method is in particular automatically interrupted if the number of wind vanes for which a failure is detected is high enough for the number of remaining wind vanes no longer to offer the redundancy necessary for the safety of the aircraft.

The method is for example automatically interrupted if only a single non-failing wind vane remains.

More specifically, when the detection module 42 receives an interruption command by a crewmember or by the piloting system 16, the detection module 42 is configured to stop the application of the predetermined detection torque CM1. The paddle 22 is then no longer subjected to the predetermined detection torque CM1 of the motor 28 and, if the wind vane 12 is in its non-blocked state, the paddle 22 is again able to rotate freely as a function of the direction and speed of the flow of air.

Likewise, when the unblocking module 44 receives an interruption command by a crewmember or by the piloting system 16, the unblocking module 44 is configured to stop the application of the predetermined unblocking torque. The paddle 22 is then no longer subjected to the predetermined unblocking torque of the motor 28 and, if the wind vane 12 is in its non-blocked state, the paddle 22 is again able to rotate freely as a function of the direction and speed of the flow of air.

Furthermore, the detection module 42 and the unblocking module 44 are capable of prohibiting any untimely command of the wind vane 12 other than an interruption command.

A method 100 for detecting blocking of at least one wind vane 12 of the aircraft 10 will now be described, in reference to FIG. 4.

The method 100 is capable of being implemented by the first detection system 14, in particular by the blockage detection module 42 and the unblocking module 44.

The method 100 is for example triggered by a crewmember of the aircraft 10, advantageously from the cockpit 46, the crewmember in particular being the pilot.

Figure 4:
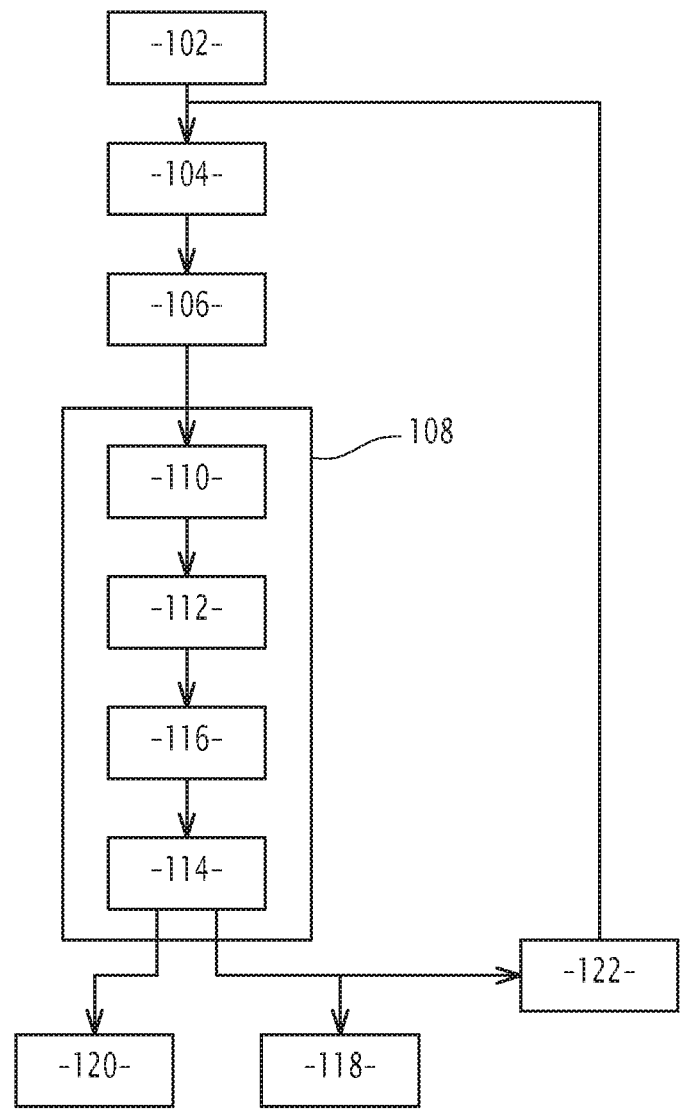
FIG. 4 is a flowchart of a method for detecting the blockage of at least one wind vane of the aircraft of FIG. 1.

This triggering is designated by reference 102 in FIG. 4.

It is implemented during a stabilized flight phase of the aircraft 10, for example a cruising flight phase of the aircraft 10. "Stabilized flight phase" refers to a flight phase for which the airplane angle of attack measured by each wind vane of the aircraft 10 is substantially the same and substantially at the same value during a non-nil time period.

The method 100 is advantageously implemented before a predetermined time period before the end of the stabilized flight phase, in particular in order to prepare a descent phase in which the measurement of the angle of attack of the aircraft 10 is an important parameter. This makes it possible to leave the stabilized flight phase with reliable measured angle of attack values.

Before the method 100 is triggered, the piloting system 16 of the aircraft typically implements the acquisition by the piloting system of a signal representative of an angle of attack of the aircraft measured by said wind vane 12. This acquisition is implemented continuously before the triggering of the method 100.

The signal representative of the angle of attack is then for example displayed, before the triggering of the method 100, to the attention of a crewmember in the cockpit 46.

Once triggered, the method 100 comprises the measurement 104 by the angular sensor 30 of the initial angular equilibrium position $\alpha_0$ of the paddle 22.

A predetermined blockage detection torque CM1 is applied on the paddle 22 by the motor 28.

This application, designated under reference 106 in FIG. 4, is implemented in particular after step 104 for measuring the initial angular equilibrium position $\alpha_0$.

The predetermined torque CM1 is chosen such that, in the non-blocked state of the wind vane 12, the paddle 22 stabilizes at the theoretical imposed angular equilibrium position $\alpha_{F,th}$.

The method 100 comprises a step 108 for verifying a predetermined condition based on a piece of information representative of a resistance of the paddle 22 to the predetermined detection torque CM1.

In the method 100, the step 108 for verification of the predetermined condition comprises the measurement 110, by the angular sensor 30, of the representative information, here formed by an imposed actual angular equilibrium position $\alpha_{F,th}$ of the paddle 22 subject to the predetermined torque CM1.

The measurement 110 of the imposed actual angular equilibrium position $\alpha_{F,th}$ is for example implemented after a predetermined length of time from the beginning of the application of the predetermined torque CM1. This predetermined time is chosen so that the paddle 22 is stabilized in the imposed actual angular equilibrium position $\alpha_{F,th}$.

This time is generally between 0 s and 10 s.

The verification step 108 next comprises calculating 112 the actual angular misalignment $\delta\alpha_{F,e}$ between the imposed actual angular equilibrium position $\alpha_{F,th}$ and the initial angular equilibrium position $\alpha_0$.

Subsequently, the verification step 100 comprises the comparison 114 of the actual angular misalignment $\delta\alpha_{F,e}$ to an angular threshold. The predetermined condition is verified if the calculated actual angular misalignment $\delta\alpha_{F,e}$ is below the angular threshold.

If the calculated actual angular misalignment $\delta\alpha_{F,e}$ is below the angular threshold, this in fact means that the paddle 22 has not rotated around the rotation axis A enough to reach the position.

Preferably, the angular threshold is an angular threshold predetermined as a function of a maximum speed achievable by the aircraft 10 during a stabilized flight phase.

This angular threshold is fixed.

This preferred solution makes it possible to obtain a better reliability of the detection inasmuch as it makes it possible not to cause the angular threshold to depend on a speed of an air flow measured by sensor. Indeed, the sensors measuring the speed of the air flow are subject to the same icing issues as the wind vane 12. Furthermore, in some cases, the sensors determine the speed of the air flow from the angle of attack whose reliability one seeks to verify.

Lastly, the method 100 comprises a step 118 for generating, via the processing unit 18, a blocking information signal of the wind vane 12, if the predetermined condition is verified.

Advantageously, the method 100 also comprises a step 120 for generating, via the processing unit 18, a non-blocking information signal of the wind vane 12, if the predetermined condition is not verified.

Preferably, at least from the beginning of the application of the predetermined detection torque CM1 and at least until step 118 for the generation of the blockage or non-blockage information signal of the wind vane 12, the acquisition by the piloting system 16 of the signal representative of the angle of attack measured by the wind vane 12 is deactivated.

Subsequently, the method 100 comprises, if the predetermined condition is verified, deactivating the acquisition of the signal representative of an angle of attack measured by the blocked wind vane 12.

If the predetermined condition is not verified, the method 100 comprises reactivating the acquisition of the signal representative of the angle of attack measured by the wind vane 12.

Furthermore, after the verification step 108, if the predetermined blockage detection condition is verified, the method 100 advantageously comprises the application 122 of the predetermined unblocking torque on the paddle 22 by the motor 28.

The value of the predetermined unblocking torque is for example greater than 5 times the value of the predetermined blockage detection torque CM1, in particular between 5 and 10 times the value of the predetermined blockage detection torque CM1.

Preferably, the predetermined unblocking torque is a torque of variable value and/or direction. This variation in value or direction makes it possible to improve the unblocking of the paddle 22.

The predetermined unblocking torque is applied during a predetermined time period.

Advantageously, after the application 122 of the predetermined unblocking torque, the method 100 comprises reiterating, at least once, steps associated with the detection of the blocking of the wind vane 12, and, if the predetermined condition is verified, the step for application 122 of the predetermined unblocking torque.

The reiteration is for example implemented at the end of said predetermined time period for application of the unblocking torque.

For example, the method 100 comprises the reiteration of the steps until the predetermined condition is not verified, i.e., until the wind vane is no longer in its blocked state.

Preferably, the method comprises a predetermined maximum number of reiterations, past which the steps are no longer reiterated even if the predetermined condition is still verified.

The method can be interrupted by a crewmember at any time or automatically as a function of detected failures of the aircraft 10, or if the length of time taken by the method is too long.

In a variant, before implementing the comparison of the actual angular misalignment $\delta\alpha_{F,e}$ to the angular threshold, the detection module 42 is configured to determine the angular threshold by measuring the speed of the air flow circulating around the paddle 22, the angular threshold being determined as a function of said measured speed of the air flow.

This speed is for example an air speed measured by sensors of the aircraft 10.

Thus, during the method 100, before this comparison, the verification step 108 comprises the determination 116 of the angular threshold. This determination for example comprises measuring the speed of the air flow circulating around the paddle 22, the angular threshold being determined as a function of said measured speed of the air flow circulating around the paddle 22.

In a variant, before the application of the predetermined detection torque CM1, the detection module 42 is configured to determine the predetermined blocking detection torque CM1 to be applied as a function of said measured speed of the air flow.

In another variant, the detection module 42 is configured to determine the angular threshold from the measurement of the evolution over time of the angular position $\alpha_t$ of the paddle 22, from the beginning of the application 106 of the predetermined detection torque CM1.

To that end, the detection module 42 is for example configured to calculate the natural frequency $f_0$ of the oscillations around the imposed actual angular equilibrium position $\alpha_{F,e}$ of said evolution over time.

This natural frequency $f_0$ depends on the speed of the air flow circulating around the paddle 22 and verifies:

$$f_0 = v * \sqrt{\frac{K1}{J}}$$

The detection module 42 is then configured to determine the angular threshold as a function of said natural frequency $f_0$. Indeed, the theoretical angular misalignment $\delta\alpha_{F,th}$ then verifies:

$$\delta\alpha_{F,th} = \frac{CM1}{Jf0^2}$$

Thus, in the detection method, the determination of the angular threshold comprises the measurement of the evolution over time of the angular position $\alpha_t$ of the paddle 22, from the beginning of the application 106 of the predetermined detection torque CM1.

Next, the natural frequency $f_0$ of the oscillations around the imposed actual angular equilibrium position $\alpha_{F,e}$ of said evolution over time is calculated, the angular threshold being determined as a function of said natural frequency $f_0$.

Like above, determining the angular threshold from said natural frequency makes it possible to further improve the reliability of the detection inasmuch as it makes it possible not to cause the angular threshold to depend on a speed of the air flow measured by sensor.

In a variant, the aircraft 10 comprises at least one other wind vane, advantageously a plurality of other wind vanes.

Preferably, each other wind vane is similar to the wind vane described above.

The first detection system 14 then comprises each of the wind vanes.

The motor of each of the other wind vanes is connected to the processing unit 18.

The functions of the detection module 42 and of the unblocking module 44 described above for the wind vane 12 are applicable for each of the other wind vanes.

The detection module 42 and the unblocking module 44 are capable of implementing the blocking and/or unblocking detection method for each wind vane successively. They are capable of prohibiting the simultaneous implementation of blocking and/or unblocking detection methods.

Thus, during operation, the method comprises, successively for each wind vane, the same steps previously described.

For example, the steps are implemented for the following wind vane only if the predetermined condition has not been verified for the previous wind vane or after the predetermined maximum number of iterations implemented for said previous wind vane.

Also in this variant, the method can be interrupted by a crewmember at any time or automatically as a function of detected failures of the aircraft 10, or if the length of time taken by the method is too long.

In an advantageous addition, the detection module 42 is configured to verify, before the application 106 of the predetermined detection torque CM1, an implementation authorization of the blocking detection.

The detection module 42 is then configured only to apply the predetermined detection torque CM1 if the authorization is verified.

Furthermore, the detection module 42 is configured to display, to the attention of the crewmember who triggered the detection method, an indication that the method has not been authorized.

The implementation is preferably authorized if the aircraft 10 comprises a number of wind vanes capable of operating greater than the maximum number of wind vanes required in order for the piloting system 16 to be able to operate, and/or if the flight phase of the aircraft 10 is a stabilized flight phase.

Thus, during the method, before the implementation of the step 106 for applying the predetermined detection torque, the method comprises a step for verifying the implementation authorization, the step 106 for application of the predetermined detection torque CM1 only being implemented if it is authorized.

A second embodiment of the detection system will now be described.

In the second system, the wind vane 12 further comprises a sensor of the motor capable of measuring an electromagnetic parameter within the motor 28.

This electromagnetic parameter, which here constitutes the representative information, is chosen such that its value varies as a function of a resistance of the paddle 22 to the predetermined detection torque CM1.

The predetermined condition based on the piece of information representative of a resistance of the paddle 22 to the predetermined detection torque CM1 then relates to the electromagnetic parameter.

The blocking detection module 42 is then configured to detect, from the electromagnetic parameter, a torque resisting the predetermined detection torque CM1, the resisting torque being applied on the paddle 22. The resisting torque and its absence are respectively representative of a blocked state and a non-blocked state of the wind vane 12.

In one exemplary embodiment, the electromagnetic parameter is the consumed intensity of the motor 28.

The blocking detection module 42 is thus configured to measure said electromagnetic parameter via the sensor of the motor at a plurality of measuring moments during a determined time interval.

The determined time interval begins from the beginning of application 106 of the predetermined detection torque CM1.

The determined time interval is chosen to be long enough that the blocking detection module 42 can determine whether the predetermined condition has been verified.

The blocking detection module 42 is then configured to compare the electromagnetic parameter, measured at each measurement moment, to a predetermined electromagnetic parameter threshold.

The detection module 42 is configured to determine that the predetermined condition is verified if the electromagnetic parameter is above the predetermined electromagnetic parameter threshold.

In other words, the predetermined condition is verified when the intensity consumed by the motor 28 is above said predetermined threshold. Indeed, an intensity consumed by the motor 28 above the threshold results in blockage of the motor 28.

In the second system, the unblocking module 44 is capable of developing the value of the predetermined unblocking torque as a function of the electromagnetic parameter.

During operation, during the method implemented by the second embodiment of the system, the step 108 for verifying the predetermined condition is implemented from the beginning of the step 106 for applying the predetermined detection torque CM1.

The verification step 108 comprises measuring said electromagnetic parameter via the sensor of the motor at a plurality of measuring moments during the determined time interval.

The electromagnetic parameter, measured at each measurement moment, is compared to a predetermined electromagnetic parameter threshold, and the predetermined condition is verified if the electromagnetic parameter is above the predetermined electromagnetic parameter threshold.

In a variant, any other electromagnetic parameter of the motor 28 whose value varies as a function of the blocked or non-blocked state of the wind vane 12 can be used in place of the consumed intensity.

In a variant, the second embodiment is in addition to the first system 14. The predetermined condition then relates both to the angular position of the paddle 22 and the electromagnetic parameter, the imposed actual angular equilibrium position $\alpha_{F,th}$ being a first representative piece of information and the electromagnetic parameter being a second representative piece of information.

In addition, the system further comprises an electrical heating device of the wind vane 12. Such a device is known from the state of the art and will not be described in more detail here.

A device is provided for unblocking one or a plurality of wind vane(s), and an associated system, as described above, without preliminary detection of the blockage of each wind vane. The method then optionally comprises, for the or each wind vane, after the application of the predetermined unblocking torque, the above steps associated with the blockage detection of the wind vane.

Owing to the features previously described, it is possible to detect the blockage of a wind vane of the aircraft 10, in particular due to ice, precisely and simply during the flight phase.

Additionally, precise identification is possible of which wind vane(s) is (are) blocked, and it is therefore possible to isolate the values supplied by this or these wind vane(s) from other, reliable values.

Furthermore, a method is provided for unblocking a blocked wind vane, in particular by ice, that is simple and has a low energy consumption, since it does not require electrical heating.

What is claimed is:

1. A method for detecting a blockage of at least one in-flight angle-of-attack sensor of an aircraft, the in-flight angle-of-attack sensor being a wind vane comprising a support, a paddle mounted rotating relative to the support along a rotation axis, a motor configured to exert a rotational torque on the paddle along the rotation axis, the motor being connected to a processing unit, the in-flight angle-of-attack sensor further comprises an angular sensor configured for measuring an angular position of the paddle around the rotation axis, the method comprising:
    measuring, by the angular sensor, an initial angular equilibrium position of the paddle;
    applying a predetermined blockage detection torque on the paddle by the motor;
    measuring at least one piece of information representative of a resistance of the paddle to the predetermined blockage detection torque;
    generating, via the processing unit, a blocking information signal of the in-flight angle-of-attack sensor, if a predetermined condition based on the information representative of the resistance is verified,
    wherein a verifying of the predetermined condition comprises:
        measuring, by the angular sensor, an imposed actual angular equilibrium position of the paddle subjected to the predetermined blockage detection torque by the motor, the information representative of the resistance being the imposed actual angular equilibrium position;

calculating an actual angular misalignment between the imposed actual angular equilibrium position and the initial angular equilibrium position; and comparing the calculated actual angular misalignment to an angular threshold, the predetermined condition being verified if the calculated actual angular misalignment is below the angular threshold.

2. The method according to claim 1, wherein the angular threshold is an angular threshold predetermined as a function of a maximum speed achievable by the aircraft during a stabilized flight phase.

3. The method according to claim 2, wherein the predetermined blockage detection torque is a predetermined torque so that a theoretical angular misalignment is detectable by the angular sensor.

4. The method according to claim 1 wherein the verifying of the predetermined condition comprises, before the comparing of the calculated actual angular misalignment to the angular threshold, determining the angular threshold, the determining of the angular threshold comprising measuring a speed of an air flow circulating around the paddle, the angular threshold being determined as a function of the measured speed of the air flow circulating around the paddle, and/or wherein the method further comprises, before the applying of the predetermined blockage detection torque, determining the predetermined blockage detection torque to be applied as a function of the measured speed of the air flow.

5. The method according to claim 1, wherein the verifying of the predetermined condition comprises, before the comparing of the calculated actual angular misalignment to the angular threshold, determining the angular threshold, the determining of the angular threshold comprising:

measuring an evolution over time of the angular position of the paddle, from a beginning of the applying of the predetermined blockage detection torque; and determining a natural frequency of oscillations around the imposed actual angular equilibrium position of the evolution over time, the angular threshold being determined as a function of the natural frequency.

6. The method according to claim 1, wherein the in-flight angle-of-attack sensor further comprises a sensor of the motor configured for measuring an electromagnetic parameter within the motor, a verifying of the predetermined condition being implemented from a beginning of the applying of the predetermined blockage detection torque, the verifying of the predetermined condition comprising:

measuring the electromagnetic parameter via the sensor of the motor at a plurality of measuring moments during a determined time interval, the information representative of the resistance being the electromagnetic parameter; and comparing the electromagnetic parameter, measured at each measuring moment, to a predetermined electromagnetic parameter threshold, the predetermined condition being verified if the electromagnetic parameter is above the predetermined electromagnetic parameter threshold.

7. The method according to claim 1, wherein the method is implemented during a flight phase of the aircraft.

8. The method according to claim 7, wherein the method is implemented during a stabilized flight phase of the aircraft.

9. The method according to claim 8, wherein the method is implemented during a cruising flight phase of the aircraft.

10. The method according to claim 1, further comprising, after a verifying of the predetermined condition, if the predetermined condition is verified, unblocking the in-flight angle-of-attack sensor by applying a predetermined unblocking torque on the paddle by the motor.

11. The method according to claim 10, further comprising, after the applying of the predetermined unblocking torque, reiterating the applying of the predetermined blockage detection torque at least once, the verifying of the predetermined condition representative of the resistance of the paddle to the predetermined blockage detection torque, and the generating of the blockage information signal via the processing unit.

12. The method according to claim 10, wherein the in-flight angle-of-attack sensor comprises an angular sensor configured for measuring an angular position of the paddle around the rotation axis; the method further comprising, before the applying of the predetermined blockage detection torque, measuring, by the angular sensor, an initial angular equilibrium position of the paddle;

wherein the verifying of the predetermined condition comprises:

measuring, by the angular sensor, an imposed actual angular equilibrium position of the paddle subjected to the predetermined blockage detection torque, the information representative of the resistance being the imposed actual angular equilibrium position;

calculating an actual angular misalignment between the imposed actual angular equilibrium position and the initial angular equilibrium position; and comparing the calculated actual angular misalignment to an angular threshold, the predetermined condition being verified if the calculated actual angular misalignment is below the angular threshold;

and wherein a value of the predetermined unblocking torque is developed as a function of the calculated actual angular misalignment.

13. The method according to claim 10, wherein the predetermined unblocking torque is a torque of variable value and/or direction.

14. The method according to claim 1, wherein a system for piloting the aircraft is configured to acquire a signal representative of an angle of attack of the aircraft measured by the in-flight angle-of-attack sensor, the method further comprising, if the predetermined condition is verified, deactivating an acquisition of the signal representative of the angle of attack measured by the blocked in-flight angle-of-attack sensor.

15. The method according to claim 1, wherein, when the aircraft comprises at least one other in-flight angle-of-attack sensor, the method comprising, successively for each in-flight angle-of-attack sensor, applying a predetermined blockage detection torque on the paddle of the in-flight angle-of-attack sensor by the motor of the in-flight angle-of-attack sensor; verifying a predetermined condition representative of a resistance of the paddle of the in-flight angle-of-attack sensor to the predetermined blockage detection torque; and generating, by the processing unit, a blockage information signal of the in-flight angle-of-attack sensor, if the predetermined condition is verified.

16. The method according to claim 1, further comprising, before implementing the applying of the predetermined blockage detection torque, verifying an implementation authorization, the applying of the predetermined blockage detection torque only being implemented if the implementation authorization is authorized, the implementation authorization being authorized if the aircraft comprises a number of in-flight angle-of-attack sensors capable of operating greater than a maximum number of in-flight angle-of-attack sensors required in order for a piloting system of the aircraft to be able to operate, and/or if a flight phase of the aircraft is a stabilized flight phase.

17. The method according to claim 1, wherein the method is at least for detecting a blockage of the in-flight angle-of-attack sensor due to a foreign body, other than ice, jamming the paddle in position.

18. The method according to claim 10, wherein a value of the predetermined unblocking torque is greater than 5 times a value of the predetermined blockage detection torque.

19. A system for detecting a blockage of at least one in-flight angle-of-attack sensor of an aircraft, the system comprising:

the in-flight angle-of-attack sensor, the in-flight angle-of-attack sensor being a wind vane and comprising a support, a paddle rotating relative to the support along a rotation axis, a motor configured to exert a rotational torque on the paddle along the rotation axis, the in-flight angle-of-attack sensor further comprises an angular sensor configured for measuring an angular position of the paddle around the rotation axis;

a processing unit configured to command the motor so that the motor applies a predetermined blockage detection torque on the paddle; and a sensor for measuring information representative of a resistance of the paddle to the predetermined detection torque, the processing unit being configured to generate a blockage information signal of the in-flight angle-of-attack sensor, if a predetermined condition based on the information representative of the resistance of the paddle to the predetermined detection torque is verified wherein the processing unit is configured to acquire, before applying the predetermined blockage detection torque, an initial angular equilibrium position of the paddle, wherein verifying the predetermined condition comprises:
acquiring, by the angular sensor, an imposed actual angular equilibrium position of the paddle subjected to the predetermined blockage detection torque by the motor, the information representative of the resistance being the imposed actual angular equilibrium position;

calculating an actual angular misalignment between the imposed actual angular equilibrium position and the initial angular equilibrium position; and comparing the calculated actual angular misalignment to an angular threshold, the predetermined condition being verified if the calculated actual angular misalignment is below the angular threshold.

* * * * *